Oct. 25, 1949.							E. P. McCORMICK					2,486,189
						WRECKER TRUCK BODY
Filed March 18, 1948												2 Sheets-Sheet 1
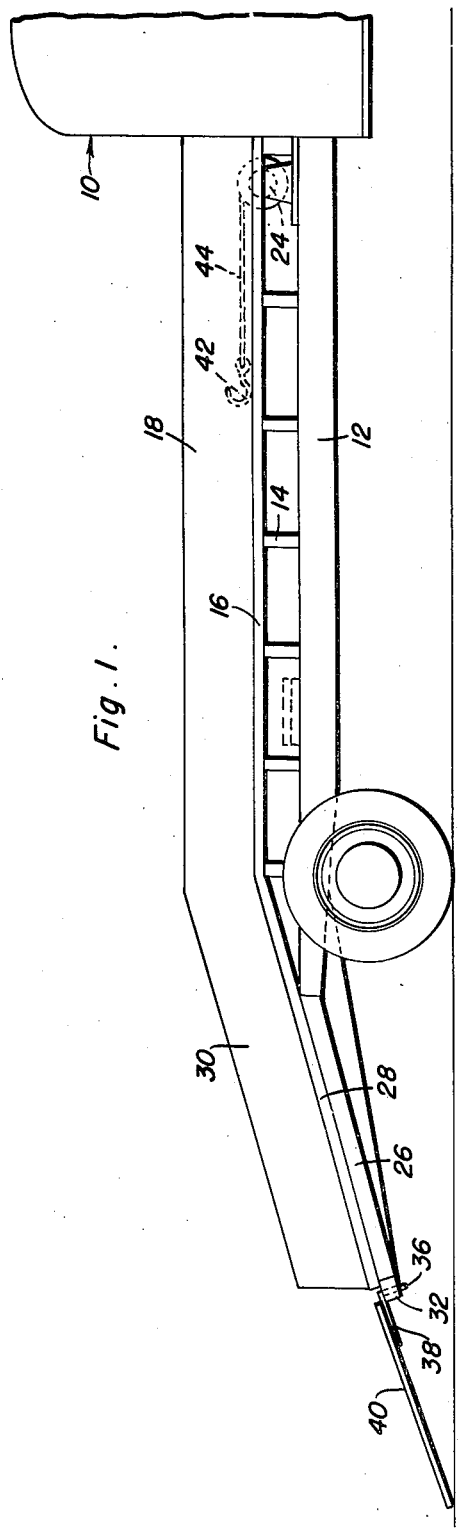
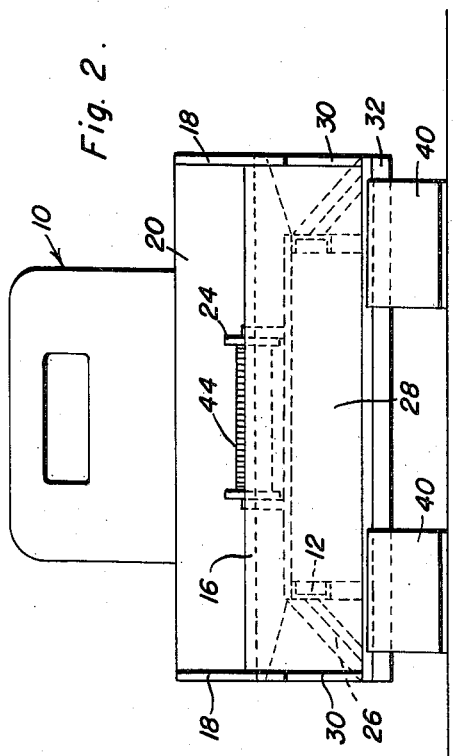
Edward P. McCormick
INVENTOR.
BY
Attorneys Oct. 25, 1949.　　　　E. P. McCORMICK　　　　2,486,189
WRECKER TRUCK BODY
Filed March 18, 1948　　　　　　　　　　　2 Sheets-Sheet 2
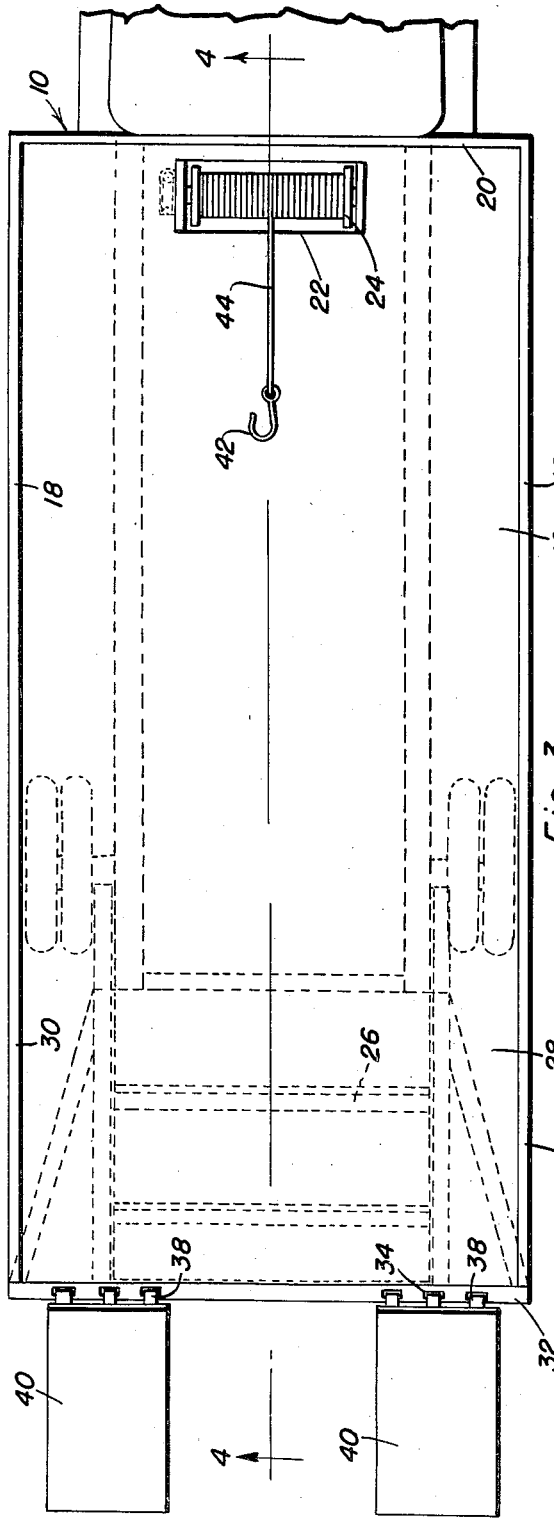
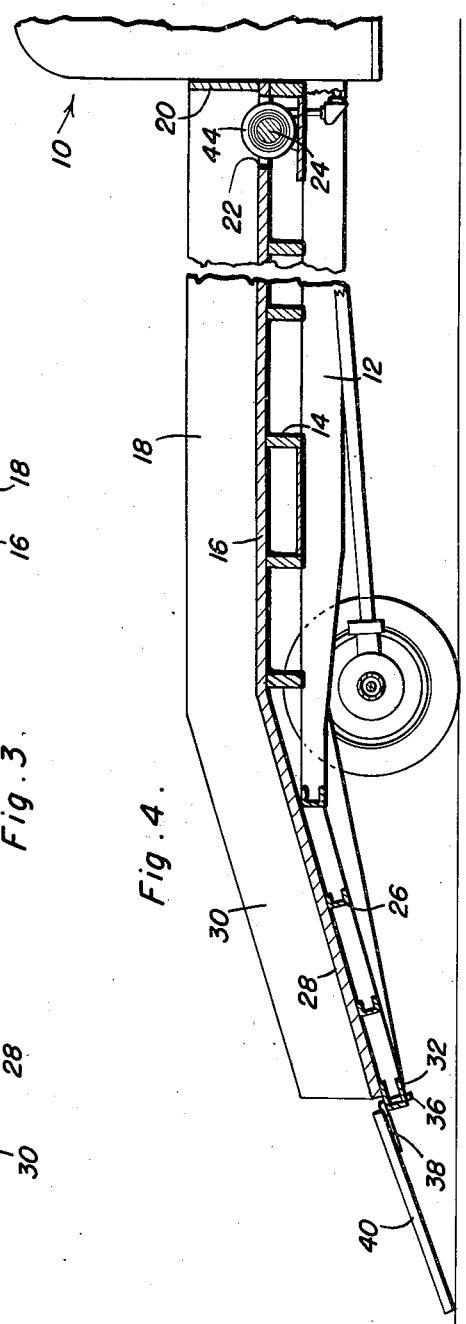
Edward P. McCormick
INVENTOR.

Patented Oct. 25, 1949

2,486,189

UNITED STATES PATENT OFFICE 2,486,189

WRECKER TRUCK BODY

Edward P. McCormick, Scranton, Pa.

Application March 18, 1948, Serial No. 15,649

4 Claims. (Cl. 214—85)

This invention relates to new and useful improvements in trucks and the primary object of the present invention is to provide a safety service body or supporting platform that is rigidly mounted on the frame of a truck.

Another important object of the present invention is to provide a supporting platform for trucks or the like which is so designed as to facilitate cars, light trucks, tractors, construction equipment or the like to be placed on the same for transportation with the platform holding truck in a convenient manner.

A further object of the present invention is to provide a wrecker body including a power driven winch, and a novel and improved approach so positioned as to permit the cable on the winch to be employed for pulling stalled vehicles or the like up onto the approach.

A still further aim of the present invention is to provide a wrecker body that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view of a truck and showing the present invention applied thereto;

Figure 2 is a rear elevational view of a truck equipped with the present invention;

Figure 3 is a top plan view of Figure 1; and

Figure 4 is a longitudinal vertical sectional view taken substantially on the plane of section line 4—4 of Figure 3.

Referring now to the drawings in detail, wherein for the purpose of illustration, there is disclosed a preferred embodiment of the present invention, the numeral 10 represents a conventional cab-over-engine chassis or truck generally, which includes a rearwardly extending wheeled frame 12.

Fixedly secured to the frame 12, is a plurality of longitudinally spaced, transverse support beams 14 on which there is fixed a platform 16 having spaced side walls 18 and a forward wall 20. This platform 16 is provided with an opening 22 that loosely engages a driven winch or cable drum 24.

Rigidly secured to the frame 12, is a rearwardly and downwardly inclined auxiliary frame 26 that fixedly supports an inclined approach 28 having side walls 30. This auxiliary frame 26 is provided with a rear support rail 32 having a plurality of spaced openings 34 that removably engage the free legs 36 of a plurality of angulated attaching arms 38 which are fixed on a pair of inclined skids 40.

In practical use of the present invention, the hook portion 42 of a cable 44 wound on the cable drum 24 is extended rearwardly and attached to a stalled vehicle or structure (not shown) which is to be pulled onto the platform 16. When the cable drum 24 is rotated, by the power take-off of the truck 10 to which the same is operatively connected, the stalled vehicle is pulled up the skids 40, the approach 28, and onto the platform 16.

When not in use, the skids 40 are quickly and readily removed from the rear rail 32 of the auxiliary frame 26 and placed on the platform 16 or in a conveniently accessible position on the frame 12.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In combination with a truck having a rearwardly extending frame, of a vehicle support, said vehicle support comprising a platform fixed on the frame, side walls carried by the platform, an approach leading to the platform, supporting means carried by the frame for the approach, and skids removably carried by the approach.

2. In combination with a truck having a rearwardly extending frame, of a vehicle support, said vehicle support comprising a platform fixed on the frame, a downwardly and rearwardly extending auxiliary supporting frame carried by the truck frame, an inclined approach carried by the auxiliary supporting frame, a pair of skids, and means removably securing the skids to the auxiliary supporting frame adjacent the approach.

3. In combination with a truck having a rearwardly extending frame, of a vehicle support, said vehicle support comprising a platform fixed on the frame, a downwardly and rearwardly extending auxiliary supporting frame carried by the truck frame, an inclined approach carried by the auxiliary supporting frame, said auxiliary supporting frame including a rear rail having a plurality of openings, a pair of skids, a plurality of attaching arms fixedly carried by the skids for removably engaging the openings in the rear rail, said platform having an opening adjacent its forward end, and a cable drum received in said opening, the ends of said cable drum being spaced from the sides of said platform.

4. In combination with a cab-over-engine truck having a rearwardly extending frame, of a vehicle support, said vehicle support comprising a platform fixed on the frame, an auxiliary supporting frame fixed to the truck frame including a rear channel member having a plurality of spaced openings therein, an inclined approach fixed on said auxiliary frame, side walls for the approach and the platform, a pair of skids, and a plurality of angulated attaching arms fixed on said skids for removably engaging the openings in the rear channel member.

EDWARD P. McCORMICK.

REFERENCES CITED

The following references are of record in the file of this patent:

UNITED STATES PATENTS

| Number | Name | Date |
|---|---|---|
| 1,677,733 | Schiftner | July 17, 1928 |
| 2,370,427 | Sherry | Feb. 27, 1945 |
| 2,424,862 | Stuart | July 29, 1947 |
| 2,436,467 | Winter | Feb. 24, 1948 |

FOREIGN PATENTS

| Number | Country | Date |
|---|---|---|
| 634,892 | France | Dec. 9, 1927 |